US008407108B2

(12) United States Patent
Foltz et al.

(10) Patent No.: US 8,407,108 B2
(45) Date of Patent: Mar. 26, 2013

(54) WAREHOUSE MANAGEMENT SYSTEM BASED ON PICK VELOCITY

(75) Inventors: Christopher T. Foltz, Poughkeepsie, NY (US); Sreekanth Ramakrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 11/859,904

(22) Filed: Sep. 24, 2007

(65) Prior Publication Data
US 2009/0082902 A1 Mar. 26, 2009

(51) Int. Cl.
G06Q 30/00 (2012.01)
G06Q 20/00 (2012.01)
(52) U.S. Cl. .................... 705/26.9; 705/22; 705/28
(58) Field of Classification Search ................ None
See application file for complete search history.

(56) References Cited

U.S. PATENT DOCUMENTS

| 5,271,703 | A | * | 12/1993 | Lindqvist et al. | 414/268 |
| 5,666,493 | A | * | 9/1997 | Wojcik et al. | 705/26 |
| 5,671,362 | A | * | 9/1997 | Cowe et al. | 705/28 |
| 5,959,568 | A | * | 9/1999 | Woolley | 342/42 |
| 6,061,607 | A | * | 5/2000 | Bradley et al. | 700/216 |
| 6,292,050 | B1 | | 9/2001 | Dooley et al. | |
| 6,622,127 | B1 | * | 9/2003 | Klots et al. | 705/28 |
| 6,744,436 | B1 | | 6/2004 | Chirieleison, Jr. et al. | |
| 6,900,689 | B2 | | 5/2005 | Kimora | |
| 7,113,025 | B2 | | 9/2006 | Washburn | |
| 7,119,527 | B2 | | 10/2006 | Fernald | |
| 8,055,508 | B1 | * | 11/2011 | Leblang | 705/1.1 |
| 2001/0049690 | A1 | | 12/2001 | McConnell et al. | |
| 2002/0059121 | A1 | | 5/2002 | Schneider et al. | |
| 2003/0200129 | A1 | * | 10/2003 | Klaubauf et al. | 705/8 |
| 2004/0024644 | A1 | * | 2/2004 | Gui et al. | 705/22 |
| 2004/0267396 | A1 | * | 12/2004 | Coppola et al. | 700/105 |
| 2005/0075949 | A1 | * | 4/2005 | Uhrig et al. | 705/28 |
| 2005/0149226 | A1 | * | 7/2005 | Stevens et al. | 700/214 |
| 2005/0216505 | A1 | | 9/2005 | Chorley et al. | |
| 2005/0261954 | A1 | | 11/2005 | Aoyama et al. | |
| 2005/0284934 | A1 | | 12/2005 | Ernesti et al. | |

(Continued)

OTHER PUBLICATIONS

Hidaka et al. "Simulation-Based Approach to the Warehouse Location Problem for a Large-Scale Real Instance", Proceedings of the 1997 Winter SImulation Conference, pp. 1214-1221.

(Continued)

*Primary Examiner* — Ryan Zeender
*Assistant Examiner* — Dana Amsdell
(74) *Attorney, Agent, or Firm* — Scully, Scott, Murphy & Presser, P.C.; Steven L. Bennett, Esq.

(57) ABSTRACT

A method and system are disclosed for determining the locations of parts in a warehouse. The method comprises the step of generating for each part an associated designator having first and second components, including the steps of, for each of the parts, (i) determining the first component of the associated designator based on physical dimensions of the part, and (ii) determining the second component of the associated designator based on a pick velocity of the part. These designators are used to identify locations in the warehouse for the parts. In a preferred embodiment, the first components of the designators are used to determine the distances of the identified locations for the parts from an entrance/exit of the warehouse, and the second components of the designators are used to determine the heights of the identified locations for the parts in the warehouse.

15 Claims, 7 Drawing Sheets

U.S. PATENT DOCUMENTS

| | | | | |
|---|---|---|---|---|
| 2006/0190338 A1* | 8/2006 | Iida et al. | | 705/16 |
| 2006/0206235 A1* | 9/2006 | Shakes et al. | | 700/216 |
| 2006/0287939 A1 | 12/2006 | Harel et al. | | |
| 2007/0021864 A1* | 1/2007 | Mountz et al. | | 700/216 |
| 2007/0162299 A1* | 7/2007 | Ito et al. | | 705/1 |
| 2008/0167884 A1* | 7/2008 | Mountz et al. | | 705/1 |

OTHER PUBLICATIONS

Kimler "Optimal Product Slotting", Maines Paper and Food Services Inc.

Gunasekaran et al. "Improving the Effectiveness of Warehousing Operations: A Case Study", Industrial Management & Data systems, pp. 328-339, 1999.

Gopalakrishnan et al. "Computer Integrated Facilities Planning and Design", Emerald Group Publishing Limited, Facilities, vol. 22, No. 7/6, pp. 199-209, 2004.

Jane et al, "A Clustering Algorithm for Item Assignment in a Synchronized Zone Order Picking System", European Journal of Operationsl Research, 166, pp. 489-496, 2005.

Cormier et al. "Conceptual Design of a Warehouse for Just-in-time Operations in a Bakery" Computers Ind. Engng., vol. 29, No. 1-4, pp. 361-365, 1995.

Naik et al. "Fuzzy C-Means Clustering Approach to Design a Warehouse Layout", Department of Industrial and Management Systems Engineering, College of Engineering, University of South Florida, pp. 1-69, Jul. 8, 2004.

Hassan A Framework for the Dsign of Warehouse Layout, Emerald, Facilities, vol. 20, No. 13/14, pp. 432-440, 2002.

Hau et al. "Batching Orders in Warehouses by Minimizing Travel Distance with Genetic Algorithms", Computers in Industry, 56, pp. 169-178, 2005.

Daniels et al. "A Model for Warehouse Order Picking", European Journal of Oeprational Research, 105, pp. 1-17, 1998.

Petersen II, The Impact of Routing and Storage Policies on Warehouse Efficiency, International Journal of Oeprations and Production Management, vol. 19, No. 10, pp. 1053-1064 1999.

Faber et al "Linking Warehouse Complexity to Warehouse Planning and Control Structure", International Journal of Physical Distribution and Logictics Management, vol. 32, No. 5, pp. 381-395 (2002).

Sly et al. Layout Design and Analysis Software.

Suarez "Shelf Space Assigned to Store and National Brands", International Journal of Retail and Distribution Management, vol. 33, No. 11, pp. 858-879, 2005.

Vandenberg "Models for Warehouse Management: Classification and Examples", International Journal of Production Economics, 59, pp. 519-528, 1999.

Rao et al. "Solution Procedures for Sizing of Warehouses", European Journal of Operational Research, 108, pp. 16-25 (1998).

Lai et al "Layout Design for a Paper Reel Warehouse: A Two-stage Heuristic Approach", International Journal of Production Economics, 79, pp. 231-243, 2002.

Poulos et al. "A Pareto-Optimal Genetic Algorithm for Warehouse Multi-Objective Optimization", Engineering applications of Artificial Intelligence, 14; pp. 737-749, 2001.

Petersen "Considerations in Order Picking Zone Configuration", International Journal of Operations and Production Management, vol. 22, No. 7, pp. 793-806, 2002.

Urban "The Interdependence of Inventory Management and Retail Shelf Management", International Journal of Physical Distribution and Logictics Management, vol. 32, No. 1, pp. 41-58, 2002.

Petersen "Improving Order Pricing Performance Utilizing Slotting and Golden Zone Storage", International Journal of Operations and Production Management, vol. 25, No. 10, pp. 997-1012, 2005.

Al-Ahmari "A Fuzzy Analysis Approach for Part-Machine Grouping in Cellular Manufacturing Systems", Integrated Manufacturing Systems, 13/7, pp. 489-497, 2002.

Wong "Supply Chain Management Practices in Toy Supply Chains", Supply Chain Management: An International Journal, 10/5, pp. 367-378, 2005.

Caron et al. "Layout Design in Manual Picking Systems: A Simulation Approach", Integrated Manufacturing Systems, 11/2, pp. 94-104, 2002.

Petersen et al. "Improving Order Picking Performance Through the Implementation of Class-Based Storage", International Journal of Physical Distribution and Logictics Management, vol. 34, No. 7, pp. 534-544, 2004.

Jandial "Study on Warehouse management Processes and Industry Practices", Infosys, pp. 1-39.

Dallari et al. "Optimization of Man-on-Board Automated Storage/Retrieval Systems", Integrated Manufacturing Systems, 11/2, pp. 87-93, 2004.

Subramaniam et al. "Simulation-Based Optimization for Material Dispatching in a Retailer Network", Proceedings of the 2004 Witner Simulation Conference, pp. 1412-1417 (2004).

Warehousing Systems, pp. 1-28, Apr. 9, 2002.

* cited by examiner

ILLUSTRATION OF SUPPLY VERSUS SHIPMENTS

SMART WMS REPORT BY INDICATOR

|  |  |  |  |  | DEMAND / PICK DATA | | | RECOMMENDED RACK SPACE | |
|---|---|---|---|---|---|---|---|---|---|
| BRAND | PROFIT CENTER | COMMODITY | MATERIAL ID | MATERIAL DESC | 90 DAY DGR | PICKS PER DAY | | UNTESTED RACK WIDTH REQD (FT) | TESTED RACK WIDTH REQD (FT) |
| PSERIES | P757RH | CLOVER | 0000053P4715 | MECH ASM CLOVER+BSWP A | 0.8 | 1.58 | | 3 | 3 |
|  |  |  | 0000080P3553 | CARDPOP CLOVER+CRDASN | 1.1 | 1.49 | | 3 | 5 |
|  |  | LABELS | 0000021H7141 | LABEL VH SECURITY | 25.8 | 18.29 | | 0 | 2 |
|  | P757SI | DASD | 0000080P5348 | MECH ASM LONG BS FC572 | 2.4 | 1.14 | | 2 | 5 |
|  |  | FLIPPER | 0000003N5014 | CARDPOP FLIPPER FC5759 | 10.5 | 1.75 | | 2 | 6 |
|  |  |  | 0000003N5029 | CARDPOP FLIPPER FC5759 | 31.7 | 12.17 | | 4 | 11 |
|  |  | GORDON | 0000003N5104 | CD W-HDWR GORDON L4 | 8.5 | 17.20 | | 1 | 2 |
|  |  |  | 0000003N5161 | CARDFRU GORDONCCIN52A | 8.5 | 17.07 | | 1 | 2 |
|  |  |  | 0000080P6009 | CARDFRU: GORDONCCIN52A | 2.2 | 4.48 | | 1 | 1 |
|  |  | P MEMORY DIMMS - SQ IH 1G | 0000012R9283 | CARDFRU 3098 MEMORY | 59.7 | 2.80 | | 3 | 4 |
|  |  | P MEMORY DIMMS - SQ IH 2G | 0000012R8540 | MODULE 30F0 MEM LA | 471.5 | 15.14 | | 4 | 15 |
|  |  |  | 0000012R9240 | CARDFRU 3090 MEMORY | 241.3 | 4.83 | | 1 | 10 |
|  |  |  | 0000053P3225 | CARDFRU 3090 MEMORY | 35.4 | 1.11 | | 1 | 3 |
|  |  | P MEMORY DIMMS - SQ IH 4G | 0000012R8616 | CARDFRU 309E 1GB CENTI | 30.9 | 1.13 | | 3 | 2 |
|  |  | PCI ADAPTER | 0000080P4353 | CARDPOP 5723 ASYN ADPT | 2.5 | 1.14 | | 0 | 6 |
|  |  | SUBR | 0000012R7923 | CD W-HDWR 271E SHI ADPT | 1.1 | 1.48 | | 0 | 3 |
|  | P757SQ | BORG | 0000080P4908 | CD W-HDWR BORM | 3.0 | 5.63 | | 0 | 0 |
|  |  |  | 0000080P4973 | CARDFRU BORM CCN529A | 0.5 | 1.07 | | 3 | 0 |
|  |  | CALISTO | 0000060H1858 | CDE W-HDWR 28E3_21 CO/NDW | 0.9 | 1.48 | | 4 | 4 |
|  |  |  | 0000060H2304 | CD W-HDWR 28E3_30 CD/NDW | 0.6 | 1.13 | | 3 | 16 |

FIG. 4

CRIB SPACE ALLOCATION REPORT
RACK SPACE ALLOCATION - BREAKDOWN

| | CURRENT UNTESTED OCCUPIED SPACE (FT) | UNTESTED RACK WIDTH REQ'D (FT) | PERCENT OCCUPIED (UNTESTED) | CURRENT TESTED OCCUPIED SPACE (FT) | TESTED RACK WIDTH REQ'D (FT) | PERCENT OCCUPIED (TESTED) | TOTAL RACK SPACE | PERCENT OF TOT REQ'D SPACE |
|---|---|---|---|---|---|---|---|---|
| A | 139 | 463 | 29.9% | 359 | 1,416 | 25.3% | 1,880 | 57% |
| B | 65 | 147 | 44.1% | 186 | 499 | 37.2% | 645 | 20% |
| C | 21 | 77 | 27.5% | 115 | 301 | 38.1% | 379 | 12% |
| D | 12 | 48 | 23.9% | 29 | 69 | 42.2% | 118 | 4% |
| E | 54 | 77 | 70.4% | 134 | 185 | 72.8% | 261 | 8% |
| TOTAL | 290 | 813 | 35.7% | 823 | 2,471 | 33.3% | 3,283 | 100% |

COMPARES CURRENT OCCUPIED SPACE TO RECOMMENDED SPACE

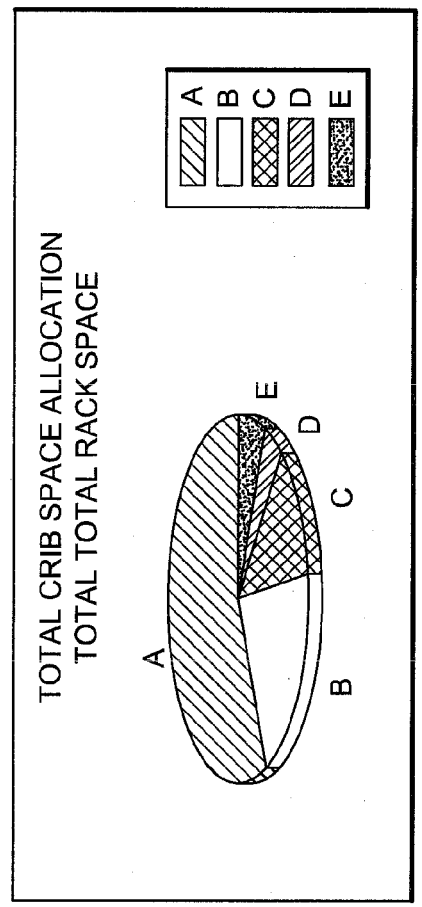

TOTAL CRIB SPACE ALLOCATION
TOTAL TOTAL RACK SPACE

FIG. 5

PHYSICAL LAYOUT OF THE WAREHOUSE BASED ON PVI

T - TEST: PAIRED TWO SAMPLE FOR MEANS

|  | TOOL GENERATED | ACTUALS |
|---|---|---|
| MEAN | 21.79 | 23.00 |
| VARIANCE | 567.81 | 326.47 |
| OBSERVATIONS | 56.00 | 56.00 |
| PEARSON CORRELATION | 0.86 | |
| HYPOTHESIZED MEAN DIF | 0.00 | |
| DF | 55.00 | |
| t STAT | -0.73 | |
| P ( T<=t ) TWO-TAIL | 0.47 | |
| t CRITICAL TWO-TAIL | 2.00 | |

SINCE t STAT<T CRITICAL, THE HYPOTHESIS CANNOT BE REJECTED
t-TEST CONDUCTED FOR RACK SPACE ALLOCATION

WAREHOUSE MANAGEMENT SYSTEM BASED ON PICK VELOCITY

BACKGROUND OF THE INVENTION

1. Field of the Invention

This invention generally relates to warehouse management systems, and more particularly, to a method and system to project required rack space based on physical dimensions and inventory peaks.

2. Background Art

Warehouses can be divided into several categories according to use. For instance, warehouses may be used within one company for storing goods for daily sales, and other warehouses may be used in factories for storing stock materials and manufactured products for retailing. Other warehouses may be used for temporary storage of import/export goods at an airport or seaport, while other warehouses may be located in an industrial or factory area for use by nearby companies.

In the past, warehouse facilities were simple, and materials were simply categorized and stored in the warehouse and retrieved on demand. Nowadays, along wish the development of international trade and the growth in the size of manufacturers, warehouses have become much more complex and, in particular, are now used to hold a large variety of incoming and outgoing goods and materials.

Many companies have built large and automated warehouses that are used so as to adjust the supply of raw materials and to prevent excess stacks that may affect company operations. Warehouses may also be managed so as to avoid a lack of raw materials on the production line, which would adversely affect product output.

In a traditional warehouse, arriving materials and goods are checked to determine if they are consistent with order request forms, receipts and other documents, and the materials and goods m&y be inspected to determine if they are damaged and if they comply to correct specifications. The incoming and outgoing materials and goods may be recorded, and the goods and materials may be stored in predetermined positions. After delivery, goods may be re-ordered, and regular stocktaking may be performed to ensure that the stocks comply with records.

One of the most time consuming and costly operations in a warehouse is 'Order picking'—the selection of items from their warehouse storage locations to fill customer orders. Several factors such as (i) demand pattern of the items, (ii) configuration of the warehouse, (iii) location of the items in the warehouse, and (iv) picking method of retrieving the items contribute to the efficiency of this operation.

Warehousing and distribution centers operations are historically one of the most frequently overlooked and inadequately planned corporate functions. Among these functions, order picking is the single largest expense in most warehouses, accounting for approximately 65% of the operational costs. Moreover, order picking has a significant impact on the cycle time of the process. When there is a requirement/customer order, the order picker has to perform the following activities—(i) travel to the pick location, (ii) search for the item, (iii) retrieve the item and (iv) return to the work location. Among these activities, search and retrieving accounts for about 40% of the total time, whereas about 55% of the time is spent traveling. Hence, improving the order picking process would have a significant impact on the operational expense of a warehousing operation, in addition to the cycle time benefits.

Today's manufacturers, facing the intensifying competition and steady pressure for higher levels of customer service, are compelled to continuously improve their supply chain management. Most of these manufacturers use the production control philosophy that combines build-to-plan with make-to-order operations, commonly referred to as the fabrication/fulfillment process. The fabrication stage is a build-to-plan process, where components are procured, tested, assembled, and then kept in stock ready for due final assembly into the end-products. The fulfillment stage is a make-to-order process, which, means that no finished goods inventory is kept for end-products and the final assembly starts after the customer order is received.

When using such a model for the business operations, it is extremely difficult to manage the warehouse from a logistical and physical layout standpoint. Numerous constraints such as part shortages and uncertain demands are present making the process extremely cumbersome to model. The travel time can be minimized by identifying the 'best' location for the parts to be placed in a warehouse. In addition to the location of a part, the warehouse managers should be able to determine the space allocation for a specific part, based on demand and supply.

Today's warehouses have to frequently execute customized transactions, handle and store more products, offer more product and service customization, and provide more value added services. However, these warehouses have very minimal time to process the orders with almost no margin for error. Numerous warehouses try to solve these challenges by implementing additional technology. However, this strategy could complicate the situation even further. Literature shows that a significant contributor to the complications in the warehouse is the lack of an effective slotting strategy. Most warehouses may be spending 10-30 percent more per year than they should, since it is estimated that less than 15 percent of the SKUs (stock-keeping units) are properly slotted.

Warehouse management is an extensively researched area from both process improvement and logistical viewpoints. There is very limited literature, though, on order picking and warehouse layout strategies. Although the existing literature talks extensively about popularity of parts, turnover and cube-per-order index, none of them specify the logic used to allocate the parts in each slot. Popularity, turnover, and cube-per-order index (COI) may perform best among slotting measures.

The most commonly used slotting strategies are as below:
1. Popularity—It is the number of picks per day, or the part velocity.
2. Turnover—The demand of a product at any time is called the turnover.
3. Volume—The product of the demand and the volume (cubic) of a product.
4. Pick Density—It is the ratio of the popularity to the cubic volume.
5. Cube-Per-Order Index (COI)—It is the ratio of the cubic volume of s part to its turnover.

The other related work in optimizing a layout focuses on identifying methods to determine the distance traveled by the operator in the warehouse. Many researchers model this as a traveling salesman problem. This work focused on reducing the picking time and not on the actual location of the parts.

Yet another area that has been researched is the method to reduce the order picking time based on volumes or turnover storage policies. In such methods, the parts with the highest number of picks were close to the front of the picking zones. Although this philosophy is very critical and effective, no method to actually determine the highest number of picks has been documented. Also, these models use static information to determine the number of picks and other attributes. This is very ineffective in a fabrication-fulfillment environment with constantly changing product demands as well as designs.

SUMMARY OF THE INVENTION

An object of this invention is to improve warehouse management systems.

Another object of the present invention is to improve the order picking process in the operation of a warehouse.

A further object of the invention is to develop an index, based on the popularity and the physical dimensions, or bulkiness, of a part, to determine the picking process in a warehouse operation.

Another object of this invention is to use both the volume of a part and its popularity (pick velocity) to determine the location of the part In a warehouse environment.

These and other objectives are attained with a method and system for determining the locations for parts in a warehouse. The method comprises the step of generating for each part an associated designator having first and second components, including the steps of, for each of the parts, (i) determining the first component, of the associated designator based on physical dimensions of the part, and (ii) determining she second component of the associated designator based on a pick velocity of the part. These designators are used to identify locations in the warehouse for the parts.

In a preferred embodiment, the using step includes the steps of using the first components of the designators to determine the distances of the identified locations for the parts from an entrance/exit of the warehouse, and using the second components of the designators to determine the heights of the identified locations for the parts in the warehouse. Also, in the preferred embodiment, the pick velocity of each part is based on a daily going late for said each part. For example, the pick velocity of each part may be determined by dividing this daily going rate for the part by a given quantity, and this given quantity may be based on a defined pick kit size for the part. In addition, due step of determining the first component of the designator associated with each part may include the step of determining said first, component based on she physical density of said each part.

In addition, a preferred methodology comprises the further step of assigning a space allocation for each part based on a defined peak supply of said each part. More particularly, in this preferred methodology, the parts include untested supply parts and tested supply parts. The space allocation for each of the untested supply parts is based on a peak quantity of said each untested supply part expected to be in the warehouse during a given period, and the space allocation for each of the tested supply parts is based on a peak point of supply for said each tested supply part during a given period.

The preferred embodiment of the invention, described below in detail, provides a dynamic, real-time tool that bridges the gap between the software and the traditional analytical models, for optimal product slotting. Using real-time data and minimal user input, the tool generates a designator to each part number, based on its historical demands and pick velocity (ABC Indicator) and its bulkiness (COI). The combined index is called a Popularity-Volume Index (PVI). Using this indicator, the products can be intelligently slotted into the warehouse. This invention will reduce pick distance and handling time, driving improvements to overall warehouse cycle time and flexibility.

The preferred embodiment of the invention addresses the problem of randomly assigning space to the warehouse part numbers. This tool's ability to project required rack space based on physical dimensions and inventory peaks is a significant feature, particularly for the Fab/Ful model, to ensure proper space utilization and to avoid the non-value add activity of continually reallocating space.

Further benefits and advantages of this invention will become apparent from a consideration of the following detailed description, given with reference to the accompanying drawings, which specify and show preferred embodiments of the invention.

BRIEF DESCRIPTION OF THE DRAWINGS

FIGS. 3-6 show various functionalities and reports of the preferred tool of the present invention.

DETAILED DESCRIPTION OF THE PREFERRED EMBODIMENTS

The present Invention, generally, provides a method and system for determining the location of parts in a warehouse environment, and the preferred methodology of the invention focuses on two key variables to drive warehouse layout and setup: the Popularity Volume Index (PVI); and the Recommended Space Allocation. Combining and leveraging these two factors promotes intelligent warehouse design, which minimizes pick cycle time, technician injuries, and unused space.

Figure 1:
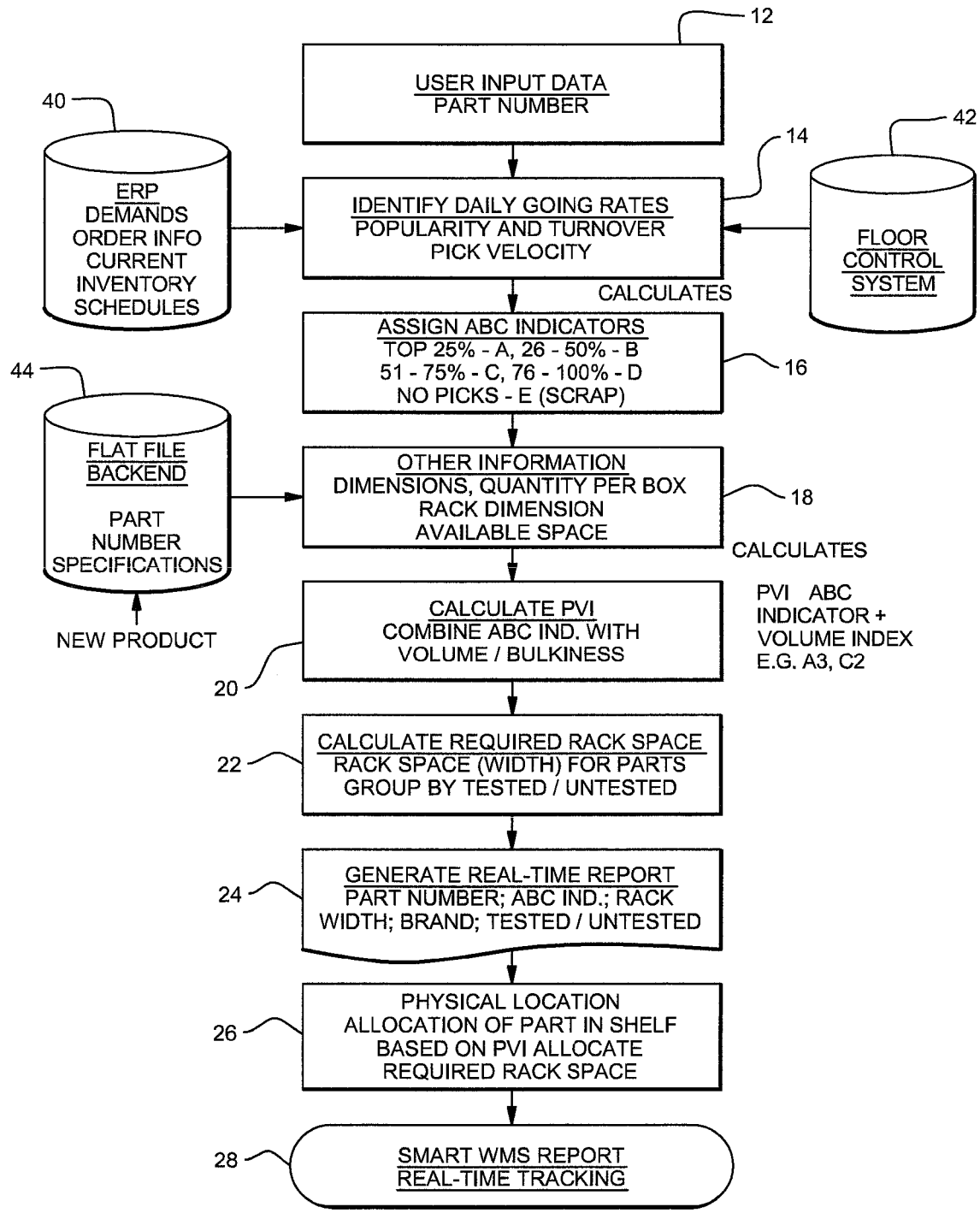
FIG. 1 illustrates a preferred, methodology of this invention.

FIG. 1 illustrates a preferred methodology. At step 12, user input data, including part numbers, are provided. Steps 14, 16, 18 and 20 are performed to determine the PVI, discussed in detail below; and at step 22, the required rack space is calculated. At step 24, real-time reports are generated; and at step 26, the physical location of each part is determined based on the PVI and the required rack space for the part. Additional reporting and tracking is performed at step 28. A more detailed discussion of this methodology, including the Popularity Volume Index and the Recommended Space Allocation, is given below.

The PVI is en alphanumeric indicator assigned at a part number level that combines pick velocity and physical dimensions to recommend a warehouse location for the past. It is calculated as shown in Equation 1.

$$PVI = PhysicalDensity(Numeric) * PickVelocity(Alphabet) \quad (1)$$

The alphabetic portion of the preferred PVI is custom designed to the Fabrication/Fulfillment environment; however it can be adapted for other domains as well.

Pick Velocity, or pick frequency, is defined as the quantity of picks made by part number per day. As parts are picked in different quantities for fabrication lots and fulfillment orders, it is critical to determine the average Fabrication/Fulfillment pick kit sizes in order to convert a daily going rate (DGR) to a pick, velocity. These kit sizes are generated by warehouse technician input as well as automated MRP data. For part, numbers without a history, commodity based assumptions may be used to forecast the kit size until order history can be recorded.

$$FabricationKitQuantity = Quantity(Fabrication) \quad (2)$$

$$FufillmentKitQuantity = Average\_Quantity(Customer\ Order\ (90\ day\ historical\ average)) \quad (3)$$

The Daily Going Rate (DGR) calculation* at step 14, can be adjusted for the desired time horizon. In this case, the recommended run frequency for due Smart CMS analysis is once per quarter, so the DGR utilised a 90 day forward-looking horizon and 10 day past-due demand coverage. Therefore, the DGR for this analysis is defined as follows:

$$DGR = \left( \frac{PastDueDemand\ (20\ Days) + ForwardlookingDemand\ (90\ Days)}{90} \right) \quad (4)$$

With the DGR and pick kit quantities defined, the Pick frequency can be calculated, at step 14, for the Fabrication/Fulfillment environment:

$$PickFrequency = \frac{DGR}{Quanitity(FabricationKit)} + \frac{DGR}{Quantit(FulfillmentKit)} \quad (5)$$

Warehouse part numbers, at step 16, are then stratified based on Pick Frequency and assigned an Alphabetic indicator as follows:

| Pick Frequency | Indicator |
|---|---|
| Top 25% of Parts | A |
| 50%-75% | B |
| 25%-50% | C |
| Bottom 25% | D |
| No Picks | E |

With the velocity portion of the PVI defined, the corresponding physical density indicator needs to be calculated, at step 18, to balance the recommendation. This is a numeric indicator defined by stratifying the physical density by part number. Actual dimensions/weights are recorded by the warehouse technicians, or package sizes/quantities are queries from data sources.

$$Product\ Volume = \frac{Length \cdot Width \cdot Height}{Quantity} \quad (6)$$

$$Product\ Density = \frac{Weight}{Volume} \quad (7)$$

| Product Density | Indicator |
|---|---|
| Top 25% Density | 4 |
| 50%-75% | 3 |
| 25%-50% | 2 |
| Lowest 25% Density | 1 |

The PVI for a part, number can now be calculated, at step 20, by combining the indicators to create an alphanumeric label for each part. The velocity portion of the PVI will drive placement with regard to the warehouse entrance/exit, keeping high velocity parts close to the pick origin. The density piece of the PVI will provide insight into vertical storage, ensuring that bulky, dense parts are stored close to ground level. This will promote safety and decrease pick time by reducing the need for some handling equipment.

Furthermore, the PVI can provide feedback into materials management scrap decisions and analysis. For example, a pail number with a PVI of 4E is a stagnant part that takes significant space and effort to manage in a warehouse. The PVI highlights these parts as primary scrap candidates.

Space Allocation

Having the above insight into the warehouse placement of a part number from the PVI, the next step 22 of the preferred embodiment of the invention is to assign a recommended space allocation for that part number to maximize space utilization and eliminate non-value-add time wasted in resizing racks. In the Fabrication/Fulfillment environment, a key complexity in allocating warehouse space for a part number is the differentiation of untested and tested supply. Separate allocation recommendations are preferably made for each type of supply.

The output of this analysis is a recommended storage rack width (in feet) by part number for both untested and tested supply. Some key pieces of data are defined and gathered to calculate these recommendations, and some of these data are common to the CGI data requirements. Specifically, these data are:

1) Storage Package Dimensions:
   Package Height, Width, Depth (inches); and Qty of parts per Storage Package.
2) Storage Rack Dimensions:
   Rack Height; Width; and Depth (inches),
3) On Hand Warehouse Supply of Part Number (Inventory management system).

Given this information, the first step In the calculation is to determine the quantity of storage packages that can be fit on the storage rack in one width of package space. This variable is called "Package qty per Package Width" and the calculation is done as follows:

$$Package\ qty\ per\ Package\ Width = \frac{RackHeight}{PackageHeight} + \frac{RackDepth}{PackageDepth} \quad (8)$$

Having the data of bow many packages can be fit in a single package width of space, the next piece of data for the calculation is the peak quantity of parts expected to be in the warehouse for each part number. This assumption differs for both tested and untested supply.

Since untested supply arrived from the vendor and is stored until it is pulled into the test floor, the replenishment qty and reorder point can be used to calculate the untested parts on hand. In this example, the warehouse has a two-day replenishment time, so two days of supply were used as the "Peak Untested Supply."

Tested supply peaks are more difficult to determine. Given the test schedule and the ship skew, parts can be tested and restocked into the warehouse to build up supply until fulfillment. Therefore, in order to account for peaks in the storage space needs, it is, in this example, important to determine the peak point of supply for a given part, number during the quarter.

Figure 2:
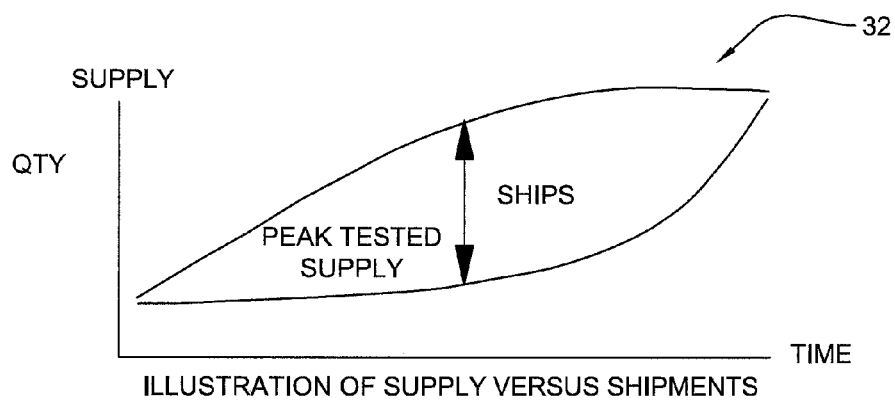
FIG. 2 is an illustration of a product supply versus product shipments graph.

FIG. 2 illustrates, at 32, the Supply/Demand curves for a typical quarter and the inventory that, would build as a result. The "Peak Tested Supply" must preferably account for the gap between these two curves.

In this example, the MRP system was queried to determine this peak supply in the quarter. Given, the supply information above, all the data to calculate the recommended space allocation is now available. One key assumption is that the recommendation will take into account the on-hand supply of the part number in order to ensure that she recommended space is never less than the current on-hand supply. The equations below will output the storage rack space (in feet) to be allocated to a given part number:

$$UntestedSpace (\text{feet}) = \frac{\frac{Max(Peak\_UntestedSupply, Onhand\_Supply)}{Quantity}}{Packag\_Qty\_per\_Package\_Width} * Package\_Width(\text{feet}) \quad (9)$$

$$TestedSpace (\text{feet}) = \frac{\frac{Max(Peak\_TestedSupply, Onhand\_Supply)}{Quantity}}{Packag\_Qty\_per\_Package\_Width} * Package\_Width(\text{feet})$$

The analysis is now complete. Equipped with the PVI and the space allocation recommendations, the warehouse managers are well equipped to not only lay out their facility by part number but to also intelligently assign rack space. The analysis is completely dynamic, so the location and footprint of each part number will change as its lifecycle progresses. The warehouse is able to be flexible and track its space utilization and layout to a logical target.

The present invention may employ a graphical user interface developed using BRIO, using ERP Systems 40, and Floor Control Systems 42 as the back-end. Moreover, the part number attributes were stored in a separate Flat File 44. The interface can be used to add or modify product information.

Figure 3:
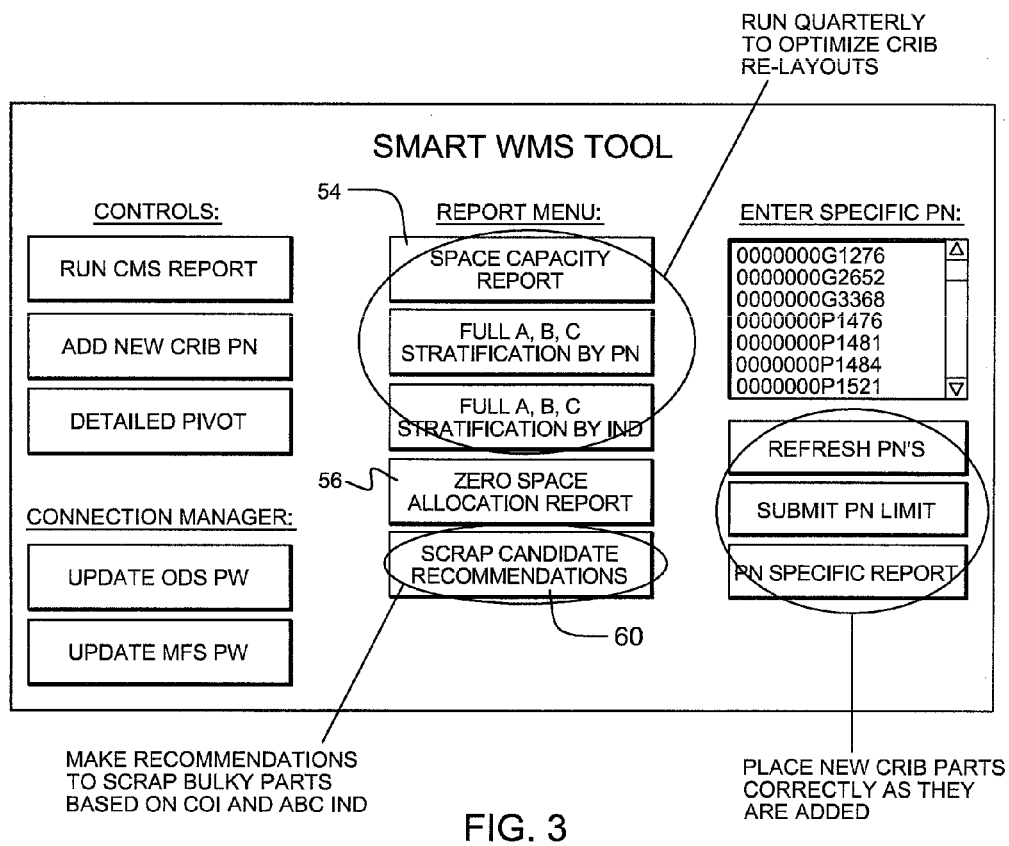

As shown in FIG. 3, the invention provides a number of reports, including a space capacity report, represented at 54, a zero space allocation report, represented at 56, and a scrap candidate recommendation, represented at 60.

FIG. 4 shows one specific report 66, which identities recommended rack space for various items.

Figure 6:
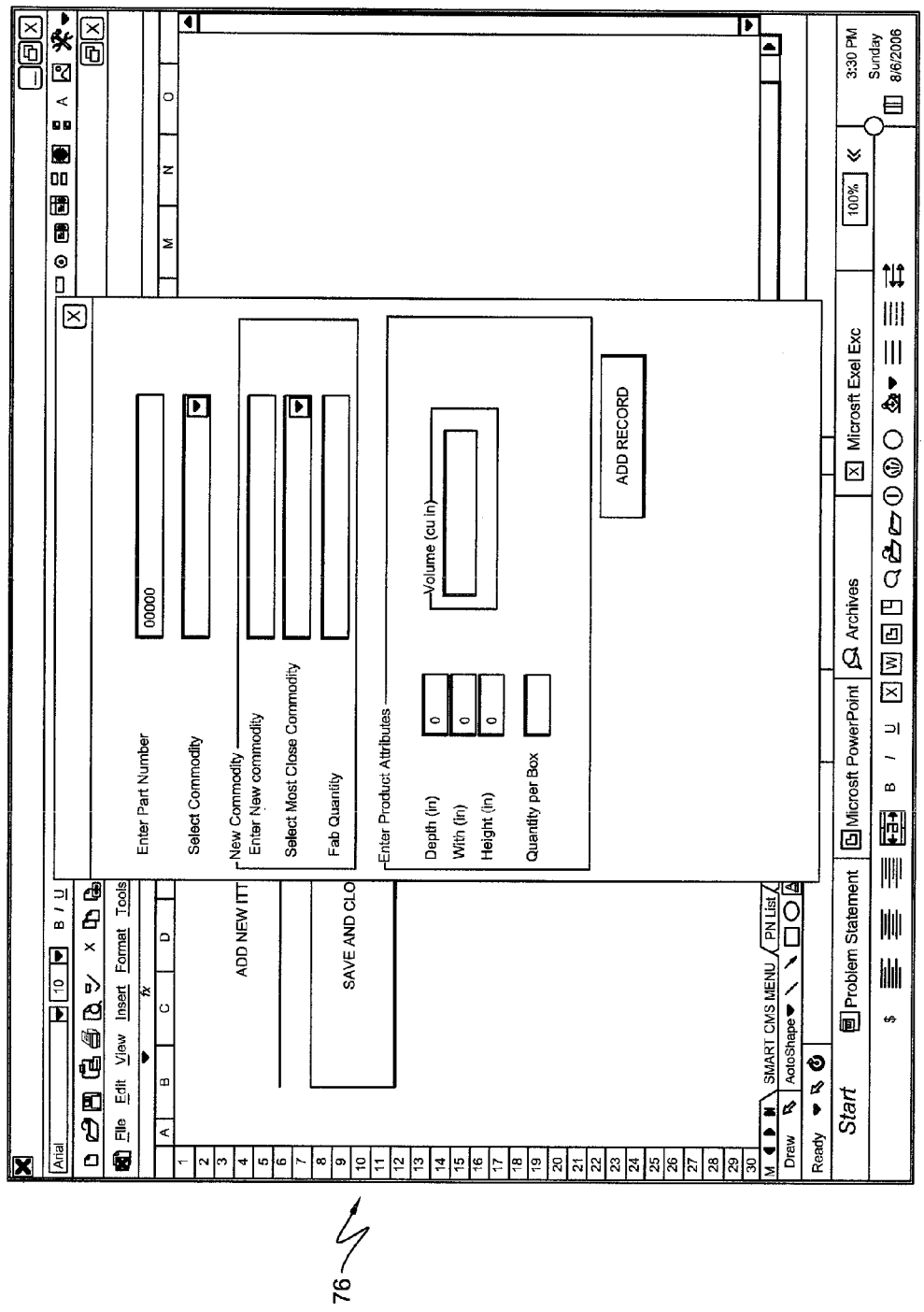

FIG. 5 illustrates a second report 72, referred to as a crib space allocation report that compares current occupied space to recommended space. FIG. 6 shows a user interface 76 that may be used to enter data, such as a part number and product attributes.

Figure 7:
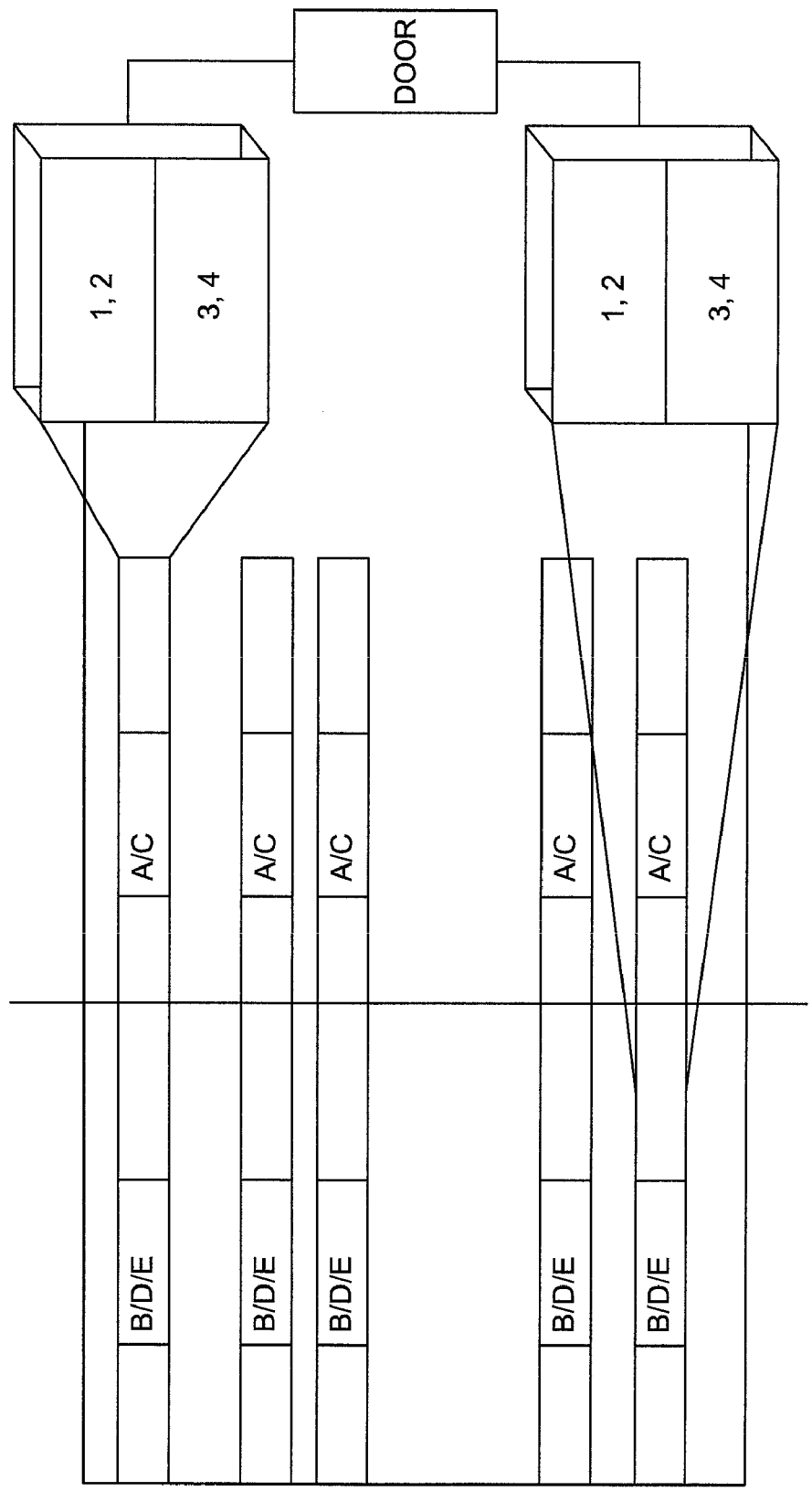
FIG. 7 shows the physical layout of a warehouse based on the present invention.

FIG. 7 shows the physical layout of a warehouse based on the PVI index. As illustrated in this FIG., the parts having "B," "D" and "E" pick velocities are stored further away from the door than the parts having "A" and "C" pick velocities, and the parts having "1" and "2" physical density values are stored above the parts having "3" and "4" physical density velocities. In addition, the stagnant "D" and "E" parts are placed high in racks in order to utilize vertical space available. This ensures an effective utilization of the available space.

Discussed below is a statistical analysis of a report generated by the preferred tool. An analysis on the output of the report with the actual layout of the warehouse was conducted. A total of 64 parts over a two-week period were considered for the analysis. The rack space (width in feet) allocated for the parts was used in the performance measure. At a significance level of 95%, it was found that the rack space allocated by the tool and the aehial allocated rack space were identical. The hypothesis test conducted for this experiment is presented in FIG. 8.

The methodology of the preferred embodiment of the invention provides a number of important benefits. Among these are: space consolidation and savings; reduction in picking distance and handling cost; using the above-discussed experiment, as an example, a reduction of 25% picking distance per annum was estimated; a potential reduction in the number of employees needed at the warehouse; and the "E" parts can be scrapped, thereby generating additional space and reducing inventory costs.

As will be readily apparent to those skilled in the art, the present invention, or aspects of the invention, can be realized in hardware, software, or a combination of hardware and software. Any kind of computer/server system(s)—or other apparatus adapted for carrying out methods described herein—is suited. A typical combination of hardware and software could be a general-purpose computer system with a computer program that, when loaded and executed, carries oat she respective methods described herein. Alternatively, a specific use computer, containing specialised hardware for carrying out one or more of the functional tasks of the invention, could be utilized.

Figures 8, 9:
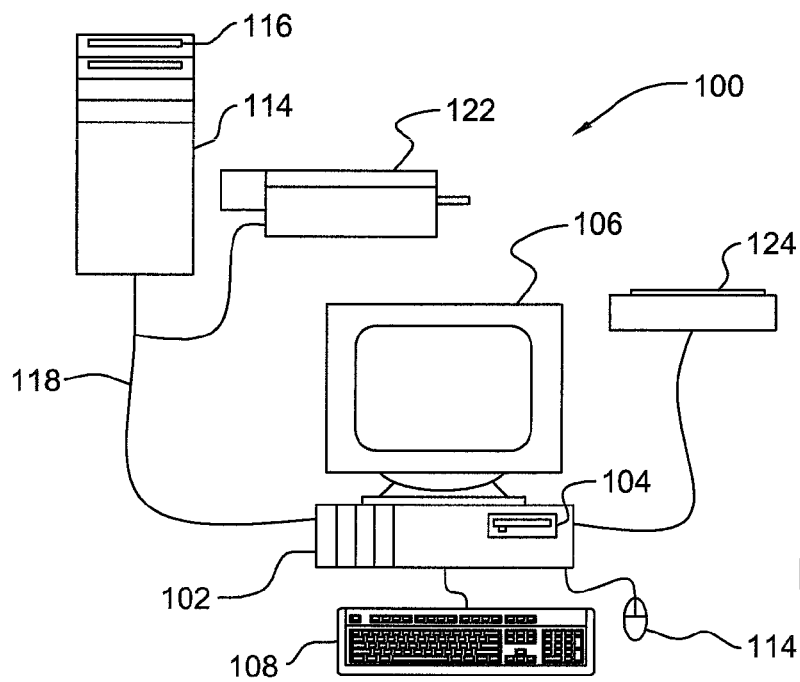
FIG. 8 gives data obtained in a test of the present invention.
FIG. 9 shows a computer system that may be used to carry out the present invention.

For example, FIG. 9 illustrates a computer system 100 which may be used in the implementation of the present invention may be carried out. Computer system includes a processing unit 102 that houses a processor, memory and other systems components that implement a general purpose processing system that may execute a computer program product comprising media, for example a floppy diskette that may be read by processing unit 102 through floppy drive 104.

The program product may also be stored on hard disk drives within processing unit 102 or may be located on a remote system 114 such as a server 116, coupled to processing unit 102, via a network interface, such as an Ethernet interface 118. Monitor 106, mouse 114 and keyboard 108 are coupled to processing unit 102, to provide user interaction. Scanner 124 and printer 122 are provided for document input and output. Printer 122 is shown coupled to processing unit 102 via a network connection, but may be coupled directly to the processing unit. Scanner 120 is shown coupled to processing unit 102 directly, hut it should be understood that peripherals may be network coupled or direct coupled without affecting the ability of workstation computer 100 to perform the method of, or aspects of, the invention.

The present inventions or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of assigning locations at which to store parts in a warehouse, comprising the steps of:
   generating for each part an associated designator having two components, including the steps of:
   for each of the parts,
   i) determining one of the components of the associated designator based on physical dimensions of the part, and
   ii) determining a second of the components of the associated designator based on a pick velocity of the part; and
   using one or more hardware processing units, executing a storage location program, to use the designator for each of the parts to assign a location at which to store said each part in the warehouse; wherein the warehouse has an entrance/exit, and the using step includes the steps of:
   using the one of the components of the designators to determine vertical distances of the assigned locations for the parts in the warehouse, and using the second of the components of the designators to determine the distances of the assigned locations for the parts from said entrance/exit, and
   wherein the step of determining the first component of the designator associated with each part includes the step of determining said first component based on the physical density of said each part; and
   wherein some of the parts are used for both fabrication kits and fulfillment kits; and the pick velocity for each of said some of the parts is based on a first portion of said each part that is used for the fabrication kits and a second portion of said each part that is used for the fulfillment kits.

2. A method according to claim 1, wherein the pick velocity of each part is based on a daily going rate for said each part.

3. A method according to claim 2, wherein the pick velocity of each part is determined by dividing the daily going rate for the part by a given quantity.

4. A method according to claim 3, wherein said given quantity is based on a defined pick kit size for the part.

5. A method according to claim 1, comprising the further step of assigning a space allocation for each part based on a defined peak supply of said each part.

6. A method according to claim 5, wherein said parts include untested supply parts, and the assigning step includes the step of assigning the space allocation for each of the untested supply parts based on a peak quantity of said each untested supply part expected to be in the warehouse during a given period.

7. A method according to claim 5, wherein said parts include tested supply parts, and the assigning step includes the step of assigning the space allocation for each of the tested supply parts based on a peak point of supply for said each tested supply part during a given period.

8. The method according to claim 1, further comprising scrapping the parts having specified associated designators.

9. The method according to claim 1, wherein:
   the pick velocity of each part is determined by dividing a daily going rate for the part by a given value;
   said given value is based on a defined number of days; and
   the method further comprises assigning a space allocation for each part.

10. A system for assigning locations at which to store parts in a warehouse, comprising:
    a processor generating for each part an associated designator having two components by determining for each of the parts, (i) one of the components of the associated designator based on physical dimensions of the part, and (ii) determining a second of the components of the associated designator based on a pick velocity of the part; and the processor, executing a storage location program, to use the designator for each of the parts to assign a location at which to store said each part in the warehouse; and wherein:
    the warehouse has an entrance/exit, and the processor uses the one of the components of the designators to determine vertical distances of the assigned locations for the parts in the warehouse, and uses the second of the components of the designators to determine the distances of the identified locations for the parts from said entrance/exit;
    the pick velocity of each part is determined by dividing a daily going rate for the part by a given quantity; and
    the first component of the designator associated with each part is determined based on the physical density of said each part.

11. A system according to claim 10, wherein the processor assigns a space allocation for each part based on a defined peak supply of said each part.

12. A system according to claim 11, wherein said parts include untested supply parts and tested supply parts, and wherein:
    the processor assigns the space allocation for each of the untested supply parts based on a peak quantity of said each untested supply part expected to be in the warehouse during a given period; and
    the processor assigns the space allocation for each of the tested supply parts based on a peak point of supply for said each tested supply part during a selected period.

13. A computer program product for assigning the locations at which to store parts in a warehouse, comprising:
    a storage device readable by a processing circuit and storing tangible instructions for execution by the processing circuit for performing a method comprising:
    generating for each part an associated designator having two components, including the steps of:
    for each of the parts,
    i) determining one of the componenets of the associated designator based on physical dimensions of the part, and
    ii) determining a second of the components of the associated designator based on a pick velocity of the part; and
    using the designator for each of the parts to assign a location at which to store said each part in the warehouse for the parts, and wherein: the warehouse has an entrance/exit, and the using step includes the steps of:
    using the one of the components of the designators to determine vertical distances of the assigned locations for the parts in the warehouse, and using the second of the components of the designators to determine the distances of the identified locations for the parts from said entrance/exit, and
    the pick velocity of each part is determined by dividing the daily going rate for the part by a given quantity, and the first component of the designator associated with each part is determined based on the physical density of said each part.

14. A computer program product according to claim 13, wherein said method further comprises the step of assigning a space allocation for each part based on a defined peak supply of said each part.

15. A computer program product according to claim 14, wherein said parts include untested supply parts and tested supply parts, and the assigning step includes the steps of:
    assigning the space allocation for each of the untested supply parts based on a peak quantity of said each untested supply part expected to be in the warehouse during a given period; and
    assigning the space allocation for each of the tested supply parts based on a peak point of supply for said each tested supply part during a given period.

\* \* \* \* \*